US008508190B2

(12) United States Patent
Tatebayashi et al.

(10) Patent No.: US 8,508,190 B2
(45) Date of Patent: Aug. 13, 2013

(54) ASSEMBLED BATTERY SYSTEM AND ASSEMBLED BATTERY PROTECTION DEVICE

(75) Inventors: Yoshinao Tatebayashi, Yokohama (JP); Shoji Otaka, Yokohama (JP); Tetsuro Itakura, Tokyo (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 571 days.

(21) Appl. No.: 12/726,828

(22) Filed: Mar. 18, 2010

(65) Prior Publication Data

US 2010/0237829 A1    Sep. 23, 2010

(30) Foreign Application Priority Data

Mar. 19, 2009    (JP) ................................. 2009-069043

(51) Int. Cl.
*H02J 7/00*    (2006.01)
(52) U.S. Cl.
USPC ........................................................ 320/118
(58) Field of Classification Search
USPC ................................................. 320/118, 122
See application file for complete search history.

(56) References Cited

U.S. PATENT DOCUMENTS

| | | | | |
|---|---|---|---|---|
| 6,160,375 A | * | 12/2000 | Horie et al. | 320/116 |
| 6,278,280 B1 | * | 8/2001 | Horie et al. | 324/436 |
| 6,356,055 B1 | * | 3/2002 | Lin et al. | 320/116 |
| 7,723,956 B2 | * | 5/2010 | Tatebayashi et al. | 320/119 |
| 8,035,344 B2 | * | 10/2011 | Shimura et al. | 320/122 |
| 2007/0229034 A1 | * | 10/2007 | Tatebayashi et al. | 320/132 |
| 2009/0066291 A1 | * | 3/2009 | Tien et al. | 320/118 |
| 2009/0278496 A1 | * | 11/2009 | Nakao et al. | 320/118 |

FOREIGN PATENT DOCUMENTS

| | | |
|---|---|---|
| JP | 8-172727 A | 7/1996 |
| JP | 9-92342 | 4/1997 |
| JP | 2000-83328 A | 3/2000 |
| JP | 2002-58169 A | 2/2002 |
| JP | 2006-34085 | 2/2006 |
| JP | 2008-281296 A | 11/2008 |

OTHER PUBLICATIONS

Office Action issued Jan. 22, 2013, in Japanese Patent Application No. 2009-069043 with English translation.

\* cited by examiner

*Primary Examiner* — Ramy Ramadan
(74) *Attorney, Agent, or Firm* — Oblon, Spivak, McClelland, Maier & Neustadt, L.L.P.

(57) ABSTRACT

An assembled battery system includes an assembled battery including a plurality of electric cell blocks connected in series, the electric cell blocks each including at least one nonaqueous electrolyte secondary battery provided with a negative electrode current collector formed of aluminum or an aluminum alloy, a voltage measuring unit configured to measure a plurality of voltages of the electric cell blocks, a controller which controls charge/discharge of the assembled battery in accordance with the measured voltages, and bypass circuits connected in parallel to the electric cell blocks, the bypass circuits each bypassing a current that flows from a negative electrode of one of the electric cell blocks to a positive electrode of the one of electric cell blocks when the measured voltage of the one of electric cell blocks is a negative value not greater than a threshold value.

12 Claims, 4 Drawing Sheets

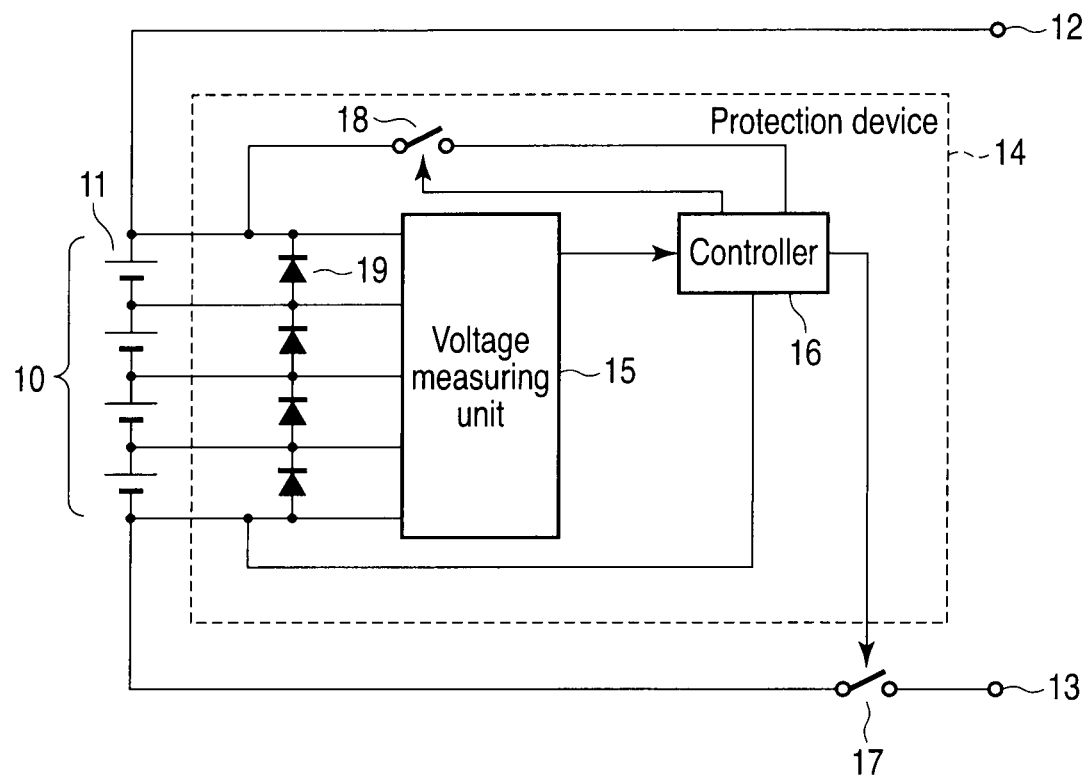
F I G. 1
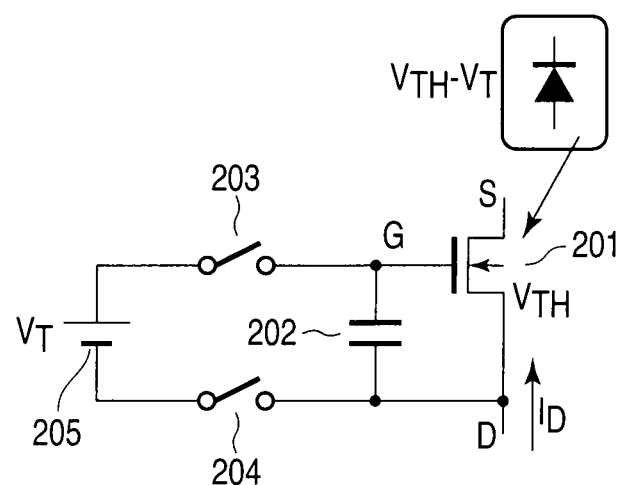
F I G. 2

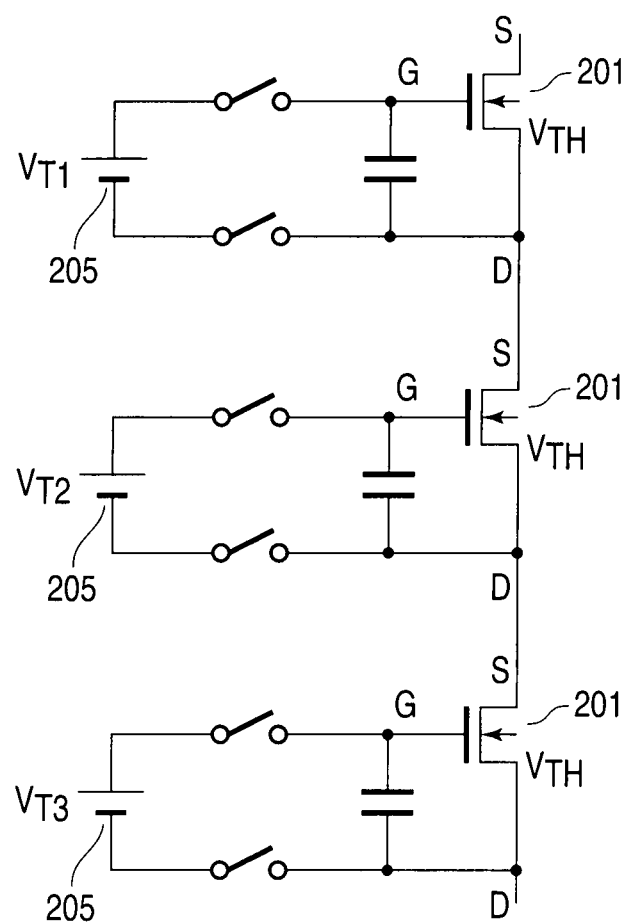
F I G. 7

ASSEMBLED BATTERY SYSTEM AND ASSEMBLED BATTERY PROTECTION DEVICE

CROSS-REFERENCE TO RELATED APPLICATIONS

This application is based upon and claims the benefit of priority from prior Japanese Patent Application No. 2009-069043, filed Mar. 19, 2009, the entire contents of which are incorporated herein by reference.

BACKGROUND OF THE INVENTION

1. Field of the Invention

The present invention relates to an assembled battery system provided with a plurality of nonaqueous electrolyte secondary batteries connected in series, and a protection device for assembled batteries.

2. Description of the Related Art

Recently, the application of secondary batteries has been rapidly increased to various devices of high output and high voltage, such as home electronic appliances, power tools, assist bicycles, hybrid vehicles. In accordance with this, the number of series-connected batteries incorporated in a so-called assembled battery is more and more increased, and it is no longer a rare case to use ten or more secondary batteries connected in series.

For an assembled battery with a large number of secondary batteries (also called electric cells) connected in series, it is necessary to provide a protection device to prevent over-charge or overdischarge of each secondary battery when the assembled battery is charged or discharged. The combination of the assembled battery and the protection device is called an assembled battery system. In particular, in the case of an assembled battery system comprising nonaqueous electrolyte secondary batteries, a protection device having a high function, which can monitor the voltages of all electric cells, is generally employed. The protection device of high function is realized by combining various integrated circuit such as microprocessors (MPUs).

When electric cells are connected in series, variations in characteristics therebetween may well raise a problem. Variations in characteristics are, for example, those in capacity, impedance, the state of charge (SOC), etc. Among these variations, voltage variations, included in SOC variations, are most liable to cause malfunctions.

When an assembled battery system with capacity or SOC variations is left uncontrolled, it is necessary to check polarity inversion. In most assembled battery systems, part or all of the power for operating the protection device is supplied from an assembled battery incorporated therein. When the system is out of a charge/discharge state, the supply of power to each element of the protection device is limited to thereby set each element in a sleep state, in order to minimize the consumption of power. Still, it is impossible to make the consumption of power zero. Continuous flowing of imperceptible current may cause polarity inversion of an electric cell of a small capacity.

In general, when a nonaqueous electrolyte secondary battery assumes an overdischarge state or polarity inverted state, the potential of the negative electrode raises to thereby cause elusion of a metal, such as a current collector, connected to the same potential as the negative electrode, and precipitation of the metal on another element. As a result, it is possible that the battery performance will be significantly degraded, and/or the separator in the battery will be broken to cause short-circuiting. In general, once polarity-inverted nonaqueous electrolyte secondary batteries cannot be reused. In light of this, in the conventional assembled battery systems, a particular operation of, for example, setting the charge amount to approx. 50% or less is necessary before the systems are subjected to long storage. Where an assembled battery is left as it is for a long time after it is completely discharged, if it is again charged, polarity inversion may well occur. In this case, the protection device inhibits charge/discharge of the battery, and hence the battery cannot be used.

JP-A 9-92342 (KOKAI) describes that Schottky barrier diodes used as bypass circuits are connected in parallel to respective nickel-cadmium batteries connected in series, to thereby bypass the current that flows from the negative electrode side of the battery, reduced in electromotive force due to degradation, to the positive electrode side, with the result that inversion of polarity is prevented.

However, the method employed in JP-A 9-92342 is not effective for preventing the polarity inversion of a nonaqueous electrolyte secondary battery. In the method of JP-A 9-92342, even if the bypass circuits normally operate, the threshold voltages of the Schottky barrier diodes are applied as negative voltages to the respective nonaqueous electrolyte secondary batteries, whereby polarity inverted states will occur and therefore the nonaqueous electrolyte secondary batteries become unable to be used.

JP-A 2006-34085 (KOKAI) discloses a rectifier that can rectify even an imperceptible signal of a level not greater than the threshold voltage of a diode.

BRIEF SUMMARY OF THE INVENTION

According to an aspect of the invention, there is provided a assembled battery system comprising: an assembled battery including a plurality of electric cell blocks connected in series, the electric cell blocks each including at least one nonaqueous electrolyte secondary battery provided with a negative electrode current collector formed of aluminum or an aluminum alloy; a voltage measuring unit configured to measure a plurality of voltages of the electric cell blocks; a controller which controls charge/discharge of the assembled battery in accordance with the measured voltages; and bypass circuits connected in parallel to the electric cell blocks, the bypass circuits each bypassing a current that flows from a negative electrode of one of the electric cell blocks to a positive electrode of the one of electric cell blocks when the measured voltage of the one of electric cell blocks is a negative value not greater than a threshold value.

According to another aspect of the invention, there is provided a protection device for an assembled battery including a plurality of electric cell blocks connected in series, the electric cell blocks each including at least one nonaqueous electrolyte secondary battery provided with a negative electrode current collector formed of aluminum or an aluminum alloy, the protection device comprising: a voltage measuring unit configured to measure a plurality of voltages of each of the electric cell blocks; a controller which controls charge/discharge of the assembled battery in accordance with the measured voltages; and bypass circuits connected in parallel to the electric cell blocks, the bypass circuits each bypassing a current that flows from a negative electrode of each one of the electric cell blocks to a positive electrode of said each the one of electric cell blocks when the measured voltage of said each the one of electric cell blocks is a negative value lower not greater than a threshold value.

BRIEF DESCRIPTION OF THE SEVERAL VIEWS OF THE DRAWING

FIG. 1 is a block diagram illustrating an assembled battery system according to a first embodiment;

FIG. 2 is a circuit diagram illustrating a specific example of a bypass circuit incorporated in the first embodiment;

FIG. 7 is a circuit diagram illustrating a bypass circuit incorporated in a third embodiment, which also serves as an SOC balancer.

DETAILED DESCRIPTION OF THE EMBODIMENT OF THE INVENTION

Figure 3:
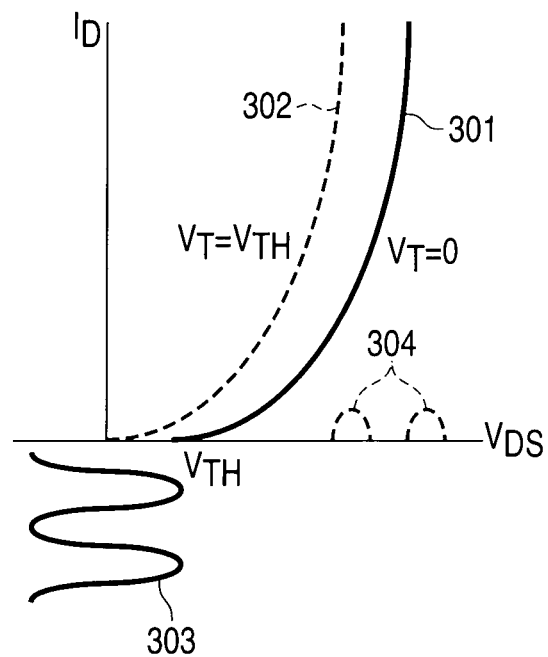
FIG. 3 is a graph illustrating the characteristics of the bypass circuit.

Embodiments of the invention will be described with reference to the accompanying drawings.

The embodiments can prevent the polarity inversion, during long storage, of each of the nonaqueous electrolyte secondary batteries (electric cells) of an assembled battery system connected in series, thereby improving long storage of the batteries.

(First Embodiment)

FIG. 1 shows an assembled battery system according to a first embodiment. The assembled battery system mainly comprises an assembled battery 10 and a protection device 14. The assembled battery 10 comprises a plurality of electric cell blocks 11 connected in series. Each electric cell block 11 uses at least one nonaqueous electrolyte secondary battery as an electric cell. When each electric cell block 11 includes a plurality of nonaqueous electrolyte secondary batteries, these batteries are connected in parallel. Each nonaqueous electrolyte secondary battery includes a negative electrode power collector formed of aluminum or an aluminum alloy.

The positive and negative terminals of the assembled battery 10 are connected to external terminals 12 and 13, respectively. The external terminals 12 and 13 are connected to a charging power supply for the assembled battery 10 during the charge of the assembled battery 10, and to a load during the discharge of the assembled battery 10.

The protection device 14 will now be described.

The protection device 14 comprises a voltage measuring unit 15, a controller 16, a charge/discharge control switch 17, a shutdown switch 18 and bypass circuits 19. The voltage measuring unit 15 is connected, via voltage measuring lines, to the positive terminal of one of the outermost electric cell blocks, to the negative terminal of the other outermost electric cell block, and to a connection node between each pair of adjacent ones of the electric cell blocks. The voltage measuring unit 15 measures the voltages (terminal voltages) of all electric cell blocks 11 sequentially or intermittently at arbitrary intervals, and provides the results of the measurement to the controller 16.

The controller 16 monitors the voltage of each electric cell block 11 measured by the voltage measuring unit 15, and controls the charge/discharge control switch 17 based on the monitoring result. More specifically, during charging, if the voltage of at least one electric cell block 11 exceeds a charging stop voltage preset for the electric cell blocks, the controller 16 turns off the charge/discharge control switch 17 to inhibit charging. In contrast, during discharging, if the voltage of at least one electric cell block 11 is less than the charging stop voltage, the controller 16 turns off the charge/discharge control switch 17 to inhibit discharging. Thus, the controller 16 performs battery protection operation that is generally carried out by a protection device for nonaqueous electrolyte secondary batteries.

The operation of inhibiting charge/discharge may be realized by turning off the charge/discharge control switch 17 as described above, or by sending a charge/discharge inhibiting signal to the charging power supply and the load connected to the assembled battery system, or to the respective controllers dedicated to the charging power supply and the load.

The bypass circuits 19 are connected in parallel to the respective electric battery blocks 11. The bypass circuits 19 are realized by so-called highly sensitive rectifiers that exhibit loss less than general ones. The highly sensitive rectifiers are realized using diodes, or MOSFETs or bipolar transistors formed by connecting diodes. Referring then to FIGS. 2 and 3, a description will be given of a rectifier including a MOSFET.

FIG. 2 is a circuit diagram illustrating a rectifier including a MOSFET 201 and used as the bypass circuit 19. The source (S) terminal of the MOSFET 201 is connected to the positive electrode of the electric cell block 11, and the drain (D) terminal of the MOSFET 201 is connected to the negative electrode of the electric cell block 11. The input/output characteristic assumed when $V_T=0$ in FIG. 3 is that assumed in the case of so-called diode connection in which the gate and drain of the MOSFET 201 in FIG. 2 is short-circuited. In the structure of FIG. 2, a capacitor 202 is connected between the gate and drain of the MOSFET 201, and switches 203 and 204 are turned on to apply a bias voltage $V_T=0$ V by a bias voltage supply 205. This structure provides the same function as the diode connection. In the structure, even if a voltage less than the threshold voltage $V_{TH}$ of the MOSFET 201 is applied between the gate and drain of the MOSFET 201, no rectification is performed.

If the bias voltage $V_T$ is set equal to, for example, the threshold voltage $V_{TH}$, the input/output characteristic of the MOSFET 201 shifts from the characteristic 301, indicated by the solid line and assumed when $V_T=0$, in a negative direction with respect to the horizontal axis. As a result, the characteristic 302 indicated by the broken line is obtained. In FIG. 3, the horizontal axis indicates the drain-source voltage $V_{DS}$ of the MOSFET 201, the vertical axis indicates the drain current $I_D$ of the MOSFET 201. As shown, in the MOSFET 201, when an AC current signal 303 is input between the drain and the source, a drain current $I_D$ flows as indicated by the broken lines 304, whereby half-wave rectification is performed.

By applying the bias voltage $V_T$ equal to the threshold voltage $V_{TH}$ of the MOSFET 201 between the gate and drain of the MOSFET 201, the threshold value for diode characteristic can be apparently set to 0 V. The aforementioned JP-A 2006-34085 (KOKAI) discloses the application of this technique to an RF tag.

The bypass circuit 19 is realized by, for example, the above-mentioned diode formed of the MOSFET 201 that has its diode characteristic threshold value apparently set to 0 V by applying the bias voltage $V_T$ equal to the threshold voltage $V_{TH}$ between the gate and drain of the MOSFET 201. The diode characteristic threshold value of the MOSFET 201 provides the threshold value of the bypass circuit 19, i.e., the voltage of the electric cell block 11 assumed when the bypass circuit 19 starts to perform bypass operation. In other words, when the voltage of the electric cell block 11 decreases to a negative value not greater than a preset threshold value (in this case, 0 V), the bypass circuit 19 bypasses the current (reverse current) flowing from the negative electrode side of the block 11 to the positive electrode side. By virtue of this bypassing operation, further decrease of the voltage of the electric cell block 11 is avoided.

The threshold value of the bypass circuit 19 is set so that even when the voltage of the electric cell block 11 is reduced to the threshold value or the polarity of the voltage is inverted, the electric cell block 11 can be reused. Assuming here that the threshold value of the bypass circuit 19 is a positive voltage, if the bypass circuit 19 discharges the remaining electricity of the electric cell block 11, thereby causing overdischarge of the block 11. Therefore, it is most preferable to set the threshold value of the bypass circuit 19 to 0 V so that no polarity inversion will occur on the electric cell block 11.

The cause of the polarity inversion of the electric cell block 11 lies in that even when part of the electric cell blocks 11 assume an overdischarge state, a discharge current continuously flows from the assembled battery 10. The voltage measuring unit 15 monitors all electric cell blocks 11, and controls the charge and discharge of the assembled battery 10 based on the result of monitoring. Accordingly, if the discharge current flowing from the assembled battery 10 even after part of the electric cell blocks 11 assume an overdischarge state flows into a normal load, discharge can be stopped before overdischarge occurs.

On the other hand, even after the discharge of the assembled battery 10 stops, a current slightly consumed by the protection device 14 continues to flow. The current consumed by the protection device 14 can be minimized by, for example, stopping the supply of power to unnecessary portions of the protection device 14. However, since the shutdown unit 18 is realized using a switch as shown in FIG. 1, the consumption power of the protection device 14 cannot completely be deleted merely by the shutdown operation.

It is sufficient if the bypass circuit 19 can bypass a current corresponding to the current consumed by the protection device 14, or corresponding to the current consumed by the protection device 14 after the consumed current is suppressed by the shutdown unit 18. In most cases, the current to be bypassed by the bypass circuit 19 is much less than the dischargeable current of the assembled battery 10, is specifically about several μA to several tens mA.

The assembled battery 10 will now be described in detail.

As aforementioned, it is preferable that a nonaqueous electrolyte secondary battery using a negative electrode power collector formed of aluminum or an aluminum alloy be used as each electric cell block 11 of the assembled battery 10.

In general, if the nonaqueous electrolyte secondary battery assumes an overdischarge state or polarity inverted state, the potential of the negative electrode increases. Increase of the negative electrode potential causes elusion of the metal of the power collector set in the same potential as the negative electrode, and precipitation of the metal on another element. As a result, the battery performance may well be significantly reduced, and/or the separator in the battery will be broken to thereby cause short-circuiting. Thus, the nonaqueous electrolyte secondary battery, which has once assumed an overdischarge state or polarity inverted state, cannot generally be reused.

In contrast, if aluminum or an aluminum alloy is used as the material of the negative electrode power collector, even when the battery assumes an overdischarge state or polarity inverted state to increase the potential of the negative electrode, aluminum as the metal of negative electrode power collector does not dissolve. As a result, reduction of the battery performance is minimized. Further, since there is no possibility of precipitation of dissolved metal causing short-circuiting, no safety hazard will occur, either. Accordingly, even the battery, which has once assumed the overdischarge state or polarity inverted state, can be reused.

In the negative electrode power collector formed of aluminum or an aluminum alloy, if the potential difference between aluminum (or the aluminum alloy) and lithium is not greater than approx. 0.3 V vs Li/Li+, both metals will alloy with each other, it cannot be used in a general nonaqueous electrolyte secondary battery using a carbon negative electrode. However, it can be used in combination with a negative electrode active material having an appropriate operation potential. Since the charge/discharge potential of lithium titanate is approx. 1.5 V vs Li/Li+, it is a preferable material as a negative electrode active material to be combined with the negative electrode power collector formed of aluminum or the aluminum alloy.

Figure 4:
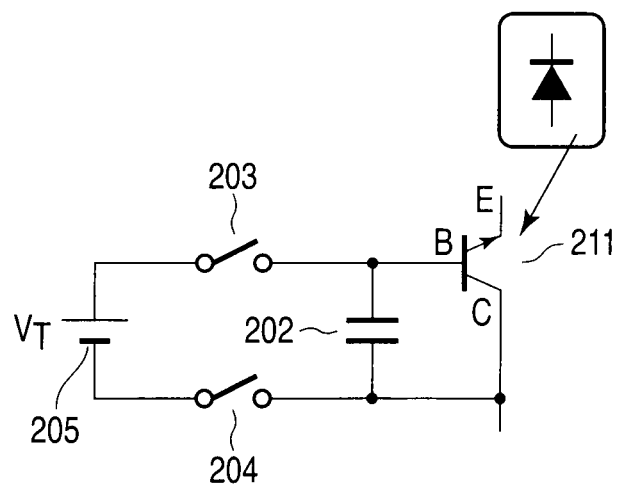
FIG. 4 is a circuit diagram illustrating another example of the bypass circuit.

Although FIGS. 2 and 3 show a rectifier using the MOSFET 201 as the bypass circuit 19, such a bipolar transistor 211 as shown in FIG. 4 may be used. In FIG. 4, the emitter (E) terminal of the transistor 211 is connected to the positive electrode of the electric cell block 11, the collector (C) terminal of the transistor 211 is connected to the negative electrode of the electric cell block 11, and a bias voltage is applied by the bias voltage supply 205 between the base (B) terminal and collector (C) terminal of the transistor 211.

(Second Embodiment)

Figure 5:
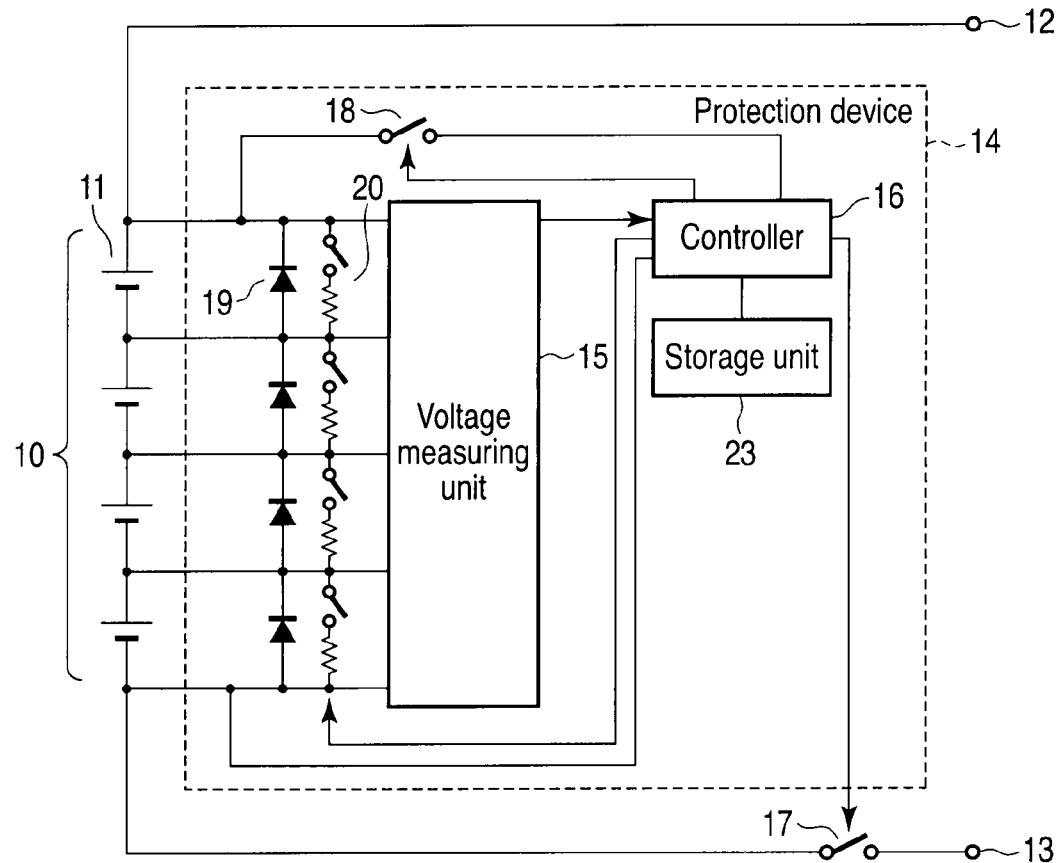
FIG. 5 is a block diagram illustrating an assembled battery system according to a second embodiment.

FIG. 5 shows an assembled battery system according to a second embodiment. The assembled battery system of the second embodiment differs from that of the first embodiment in that the former additionally incorporates SOC balancers 20 connected in parallel to the respective electric cell blocks 11, and a storage unit 23 connected to the controller 16. Firstly, the SOC balancer 20 will be described.

As described above, in the assembled battery 10 including a plurality of electric cell blocks 11 connected in series, variations in characteristics therebetween, in particular, SOC variations, which are most liable to cause malfunctions, are problematic. In the assembled battery 10, when the electric cell blocks 11 are connected in series with the SOC variations left therein, if the assembled battery 10 is charged, the electric cell blocks 11 may vary in voltage, and only part of the blocks 11 be overcharged.

The SOC variations may be caused by a factor that will occur during the use of the assembled battery, as well as by initial variations between the electric cell blocks. For instance, there is a case where the electric cell blocks vary in discharge amount because of temperature differences between the blocks, and a case where the electric cell blocks vary in discharge current because of the respective loads included in the protection device. In particular, in a high voltage assembled battery including a large number of electric cell blocks connected in series, the protection device is inevitably complex in structure, and hence the electric cell blocks are liable to vary in the current discharged by the loads included in the protection device. These varying factors may cause and increase SOC variations during the use of the battery or while the battery is not used.

As described above, in the assembled battery system, the problem of occurrence of SOC variations is almost inevitable to a greater or lesser extent. Therefore, where the assembled battery is fully charged, if SOC variations occur, the electric cell blocks are divided into ones having voltages higher than the average, and ones having voltages lower than the average. The electric cell blocks having higher voltages assume overcharged states, and will significantly be degraded. If such charging as this is repeated, the electric cell blocks degraded due to overcharge are reduced in capacity, which involves further overcharge and accelerated degradation. As a result, it is possible that the cycle life of the assembled battery will significantly be shorter than the life of each electric cell block.

To avoid this, it is effective to perform control of strictly monitoring the voltage of each electric cell block using the protection device 14, and adjusting the maximum voltage less than the charging stop voltage, and adjusting the minimum voltage less than the discharging stop voltage. It is also effective to perform, using the SOC balancers 20 as in the second embodiment, control of eliminating variations in SOC between the electric cell blocks that occur when the cell blocks are fully charged.

Figure 6:
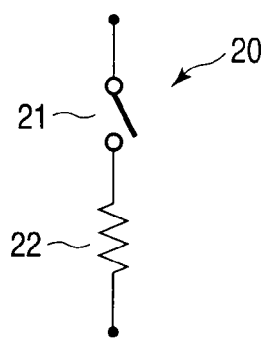
FIG. 6 is a circuit diagram illustrating a specific example of an SOC balancer incorporated in the second embodiment.

The SOC balancers 20 of the second embodiment are provided to eliminate the SOC variations between the electric cell blocks 11 by individually discharging the cell blocks 11, thereby balancing the SOC. Each SOC balancer 20 is formed of, for example, a semiconductor switch 21, such as a FET, and a resistor 22 connected in series to the switch, as is shown in FIG. 6. Each SOC balancer 20 is connected in parallel to the corresponding electric cell block 11. By turning on and off the switch 21 using a control signal from the controller 16, the SOC balancer 20 can cause a required amount of current to flow through the corresponding electric cell block 11 for a required period of time. FIG. 6 shows an example of the SOC balancer 20. The SOC balancer may have another structure to realize the same function as the above.

The SOC balancer 20 basically operates as follows: When the controller 16 determines, based on the voltage measurement result from the voltage measuring unit 15, and/or other information, that SOC variations have occurred between the electric cell blocks 11, it drives the SOC balancer(s) 20 corresponding to the electric cell block(s) 11 that has a larger amount of charge (i.e., a higher SOC) than the other cell blocks. As a result, the electric cell block(s) 11 that has a higher SOC is discharged, whereby the electric cell blocks 11 are balanced in SOC.

In the assembled battery system of the second embodiment, if the voltage of a certain electric cell block 11 assumes a negative value not greater than the threshold value of the corresponding bypass circuit 19, the bypass circuit 19 is turned on to bypass therethrough the reverse current directed from the negative side to the positive side. The SOC of the certain electric cell block 11 having a reverse current bypassed becomes higher than the SOCs of the other electric cell blocks 11. When the bypass circuit 19 is operated, the polarity inversion, in which the current flowing through the electric cell block 11 exceeds the threshold value, is suppressed, but it is possible that SOC variations will increase where the assembled battery system is substantially fully charged.

In the assembled battery system using nonaqueous electrolyte secondary batteries as in the second embodiment, during charging, constant-current/constant-voltage charging is generally performed to charge the electric cell blocks as much as possible, while suppressing overcharge of the cell blocks. To this end, it is desirable that the electric cell blocks 11 have the same SOC during charging. In the second embodiment, the electric cell blocks 11 are balanced in SOC during charging in the following manner.

The storage unit 23 stores the history of the bypassing operations of the controller 16 for each electric cell block 11. Namely, the storage unit 23 stores a bypass history associated with each electric cell block 11, i.e., the history as to whether the bypass circuit 19 has bypassed a reverse current. Referring to each bypass history stored in the storage unit 23, the controller 16 can detect the electric cell block(s) 11 in which a reverse current is bypassed during previous charging.

After that, when charging the assembled battery 10, the controller 16 causes the electric cell block(s) 11, in which a reverse current is bypassed by the corresponding bypass circuit(s) 19 during previous charging, to be appropriately discharged through the corresponding SOC balancer(s) 20. As a result, the amount(s) of charge in the electric cell block(s) 11, in which a reverse current is bypassed by the corresponding bypass circuit(s) 19 during previous charging, are less than those of the other electric cell blocks 11. Thus, by controlling the SOC balancers 20 referring to the bypass histories of the bypass circuits 19, the electric cell blocks 11 can be quickly balanced in SOC before errors in SOC balance are detected.

(Third Embodiment)

In the above-described second embodiment, the SOC balancers 20 each formed of the semiconductor switch 21 and the resistor 22 are controlled in relation to the bypass histories stored in the storage unit 23 for the respective electric cell blocks 11. On the other hand, in a third embodiment described below, the SOC balancers are realized by other manners.

FIG. 7 shows an example of a bypass circuit 19 according to the third embodiment, which also has a function equivalent to, for example, three SOC balancers connected in series and corresponding to three electric cell blocks connected in series. In the third embodiment, the bias voltage $V_T$ applied to the MOSFET 201 of the bypass circuit 19 of each electric cell block 11 is changed to, for example, $V_{T1}$, $V_{T2}$ and $V_{T3}$ in accordance with SOC variations, thereby changing the apparent threshold voltage $V_{TH}$ of the MOSFET 201. This enables the bypass circuit 19 of each electric cell block 11 to discharge a necessary discharge current for a necessary period of time, thereby balancing the electric cell blocks in SOC. Variable voltage sources are used as bias voltage $V_T$ sources, and generate various voltages such as $V_{T1}$, $V_{T2}$ and $V_{T3}$ under the control of the controller 16.

The third embodiment will now be described in more detail, using specific examples.

EXAMPLE 1

An assembled battery 10 was prepared in which lithium titanate was used as a negative electrode active material, and ten electric cell blocks 11 were connected in series and were each formed of a single nonaqueous electrolyte secondary battery. The nonaqueous electrolyte secondary battery used aluminum foil as a negative electrode power collector, and had a discharge capacity of 3 Ah. The electric cell blocks 11 were connected to the protection device 14 via lead wires. In the protection device 14, bypass circuits 19 for causing a reverse current to flow from the negative electrode side of the respective electric cell blocks 11 to the positive electrode side were provided. Thus, such an assembled battery system as shown in FIG. 1 was prepared. The threshold value of the bypass circuits 19, i.e., the voltage at which the bypass circuits 19 start bypassing operations, was set to 0 V. The current consumption of the protection device 14 when the assembled battery 10 was not used was 0.5 mA.

EXAMPLE 2

The same assembled battery 10 as that of Example 1 was prepared and connected to the protection device 14 via lead wires. In the protection device 14, bypass circuits 19 for causing a reverse current to flow from the negative electrode side of the respective electric cell blocks 11 to the positive electrode side were provided, and further SOC balancers 20 were connected in parallel to the electric cell blocks 11. The SOC balancers 20 were each formed of a semiconductor switch 21 and a resistor 22 that were similar to those shown in FIG. 6 and connected in series. The semiconductor switches 21 of the SOC balancers 20 were designed to be individually controlled by the controller 16.

In Example 2, when the voltage of a certain electric cell block 11 assumes a negative value not greater than the threshold value of the corresponding bypass circuit 19, the bypass circuit 19 is turned on to bypass therethrough a reverse current directed from the negative side to the positive side. The storage unit 23 stores the bypassing history of the bypass circuit 19 of each electric cell block 11. When thereafter charging the assembled battery 10, the controller 16 operated the SOC balancers 20 to discharge the electric cell blocks 11 having a bypass current passed therethrough. The controller 16 controlled the discharge times of the SOC balancers in accordance with the periods of time for which the voltages of the electric cell blocks 11 were not greater than the threshold value of the bypass circuits 19.

In Example 2, the threshold value of the bypass circuits 19 was set to 0 V, as in Example 1. The current consumption of the protection device 14 when the assembled battery 10 was not used was 0.5 mA.

COMPARATIVE EXAMPLE 1

The same assembled battery 10 as that of Example 1 was prepared, and each bypass circuit in a protection device was formed of a silicon diode having an anode thereof connected to the negative side of the corresponding electric cell block, and a cathode thereof connected to the positive side of the corresponding electric cell block.

COMPARATIVE EXAMPLE 2

The same assembled battery 10 as that of Example 1 was prepared, and no bypass circuits were provided in a protection device.

The above-mentioned examples 1 and 2 and comparative examples 1 and 2 were subjected to the following processes:

The discharge capacity, obtained when each of the assembled batteries as Examples 1 and 2 and Comparative Examples 1 and 2 was subjected to a 1 C charge/discharge process at 25° C., was measured. Here, the charge and discharge current of a battery is measured in C-rate. A discharge of 1 C draws a current equal to the rated capacity. For example, a battery rated at 1000 mAh provides 1000 mA for one hour if discharged at 1 C rate. 1 C charge/discharge is often referred to as a one-hour charge/discharge. Further, the 1-kHz AC impedance of each assembled battery was measured, with the SOC of each electric cell block set to 50%. Subsequently, a 1 C charge process and a 1 C discharge process were repeated ten times at 25° C., and a change in discharge capacity resulting therefrom was measured. After that, each assembled battery was subjected to 0.1 C discharge until the SOC of each electric cell block reached 0%, and was then stored for two months at 25° C. After the storage, the voltage of each electric cell block was measured, and the discharge capacity of each assembled battery during 1 C charge/discharge at 25° C. was measured, and the 1-kHz AC impedance of each assembled battery was measured, with the SOC of each electric cell block set to 50%. In addition, the 1 C charge process and the 1 C discharge process were repeated fifty times at 25° C., and a change in the discharge capacity of each assembled battery resulting therefrom was measured. TABLE 1 below shows the impedances of each assembled battery, the maximum and minimum voltages of each electric cell block, which were obtained before and after the storage.

TABLE 1

|  | AC Impedance Before Storage | Minimum Voltage of Electric Cell Block After Storage | Maximum Voltage of Electric Cell Block After Storage | AC Impedance After Storage |
|---|---|---|---|---|
| Example 1 | 41 mΩ | 0 V | 0.8 V | 45 mΩ |
| Example 2 | 41 mΩ | 0 V | 0.6 V | 44 mΩ |
| Comparative Example 1 | 41 mΩ | −0.55 V | 0.9 V | 55 mΩ |
| Comparative Example 2 | 41 mΩ | −3.2 V | 1.8 V | 65 mΩ |

As shown in TABLE 1, in Examples 1 and 2, the polarity inversion of each electric cell block is suppressed after the storage. In contrast, in Comparative Example 1, a polarity inversion of 0.55 V occurs in the ON voltage of a silicon diode incorporated in each bypass circuit. In Comparative Example 2 having no bypass circuits, there are some electric cell blocks in which a polarity inversion of 3.2 V occurs after the storage.

In Examples 1 and 2, there is almost no increase in AC impedance even after the storage. In contrast, in Comparative Examples 1 and 2, the electric cell blocks are significantly degraded due to polarity inversion, which inevitably increases the AC impedances of the assembled batteries.

Further, in Examples 1 and 2, there is almost no degradation even when 11 cycles have passed after the storage, and the capacity is maintained at the same rate as before the storage. In contrast, in Comparative Examples 1 and 2, the capacity is significantly reduced after the storage. Example 1 differs from Example 2 in that only the former incorporates the SOC balancers 20. In Example 2, since there are no SOC balancers, the electric cell blocks are unbalanced in SOC by the current capacity corresponding to the bypass current made to flow through each block to prevent polarity inversion during storage. As a result, the charging capacity of each electric cell block is reduced to slightly reduce its capacity, although this reduction does not significantly influence the practical use. In Example 1, the SOC balancers operated during charging after the storage, which prevents reduction in capacity.

What is claimed is:
1. An assembled battery system comprising:
    an assembled battery including a plurality of electric cell blocks connected in series, the electric cell blocks each including at least one nonaqueous electrolyte secondary battery provided with a negative electrode current collector formed of aluminum or an aluminum alloy;
    a voltage measuring unit configured to measure a plurality of voltages of the electric cell blocks;

a controller which controls charge/discharge of the assembled battery in accordance with the measured voltages; and bypass circuits connected in parallel to the electric cell blocks, the bypass circuits each bypassing a current that flows from a negative electrode of one of the electric cell blocks to a positive electrode of the one of electric cell blocks when the measured voltage of the one of electric cell blocks is a negative value not greater than a threshold value, wherein the bypass circuits each include a MOSFET and a bias voltage source, the MOSFET storing a threshold voltage and having a source terminal connected to the positive electrode of a first corresponding one of the electric cell blocks, a gate terminal and a drain terminal, a drain terminal connected to the negative electrode of the first corresponding electric cell block and a gate terminal, the bias voltage source applying a bias voltage between the gate terminal and the drain terminal.

2. The system according to claim 1, wherein the threshold voltage of the MOSFET is equal to the bias voltage.

3. The system according to claim 1, further comprising state of charge (SOC) balancers provided for the electric cell blocks, each of the SOC balancers discharging a second corresponding one of the electric cell blocks to balance the second corresponding electric cell block in an SOC, and a storage unit configured to store bypass histories of the bypass circuits, and wherein the controller detects, during charging of the assembled battery, the electric cell block which is included in the electric cell blocks and in which bypassing of a current is performed previously, referring to the bypass histories in the storage unit, and controls the SOC balancers to cause a charge amount of the detected electric cell block to be smaller than a charge amount of each of electric cell blocks other than the detected electric cell block.

4. The system according to claim 3, wherein each of the SOC balancers includes a series circuit of a switch and a resistor, the series circuit being connected in parallel to the second corresponding electric cell block, the switch being turned on or off by the controller to discharge the second corresponding electric cell block.

5. The system according to claim 1, wherein the bypass circuits also serve as state of charge (SOC) balancers, and the controller varies a bias voltage in accordance with variations in the SOC to control the SOC balancers.

6. The system according to claim 5, further comprising SOC balancers provided for the electric cell blocks, each of the SOC balancers discharging a second corresponding one of the electric cell blocks to balance the second corresponding electric cell block in SOC, and a storage unit configured to store bypass histories of the bypass circuits, and wherein the controller detects, during charging of the assembled battery, an electric cell block which is included in the electric cell blocks and in which bypassing of a current is performed previously, referring to the bypass histories in the storage unit, and controls the SOC balancers to cause a charge amount of the detected electric cell block to be smaller than a charge amount of each of electric cell blocks other than the detected electric cell block.

7. The system according to claim 1, wherein the bypass circuits each include a bipolar transistor and a bias voltage source, the bipolar transistor having an emitter terminal connected to the positive electrode of a first corresponding one of the electric cell blocks, a collector terminal connected to the negative electrode of the first corresponding electric cell block, and a base terminal, the bias voltage source applying a bias voltage between the base terminal and the collector terminal.

8. The system according to claim 7, further comprising state of charge (SOC) balancers provided for the electric cell blocks, each of the SOC balancers discharging a second corresponding one of the electric cell blocks to balance the second corresponding electric cell block in SOC, and a storage unit configured to store bypass histories of the bypass circuits, and wherein the controller detects, during charging of the assembled battery, an electric cell block which is included in the electric cell blocks and in which bypassing of a current is performed previously, referring to the bypass histories in the storage unit, and controls the SOC balancers to cause a charge amount of the detected electric cell block to be smaller than a charge amount of each of electric cell blocks other than the detected electric cell block.

9. The system according to claim 8, wherein the bypass circuits also serve as the SOC balancers, and the controller varies the bias voltage in accordance with variations in the SOC to control the SOC balancers.

10. The system according to claim 1, wherein the at least one nonaqueous electrolyte secondary battery includes a negative electrode active material containing lithium titanate.

11. A protection device for an assembled battery including a plurality of electric cell blocks connected in series, the electric cell blocks each including at least one nonaqueous electrolyte secondary battery provided with a negative electrode current collector formed of aluminum or an aluminum alloy, the device comprising:

a voltage measuring unit configured to measure a plurality of voltages of the electric cell blocks;

a controller which controls charge/discharge of the assembled battery in accordance with the measured voltages; and bypass circuits connected in parallel to the electric cell blocks, the bypass circuits each bypassing a current that flows from a negative electrode of one of the electric cell blocks to a positive electrode of the one of electric cell blocks when the measured voltage of the one of electric cell blocks is a negative value not greater than a threshold value, wherein the bypass circuits each include a MOSFET and a bias voltage source, the MOSFET storing a threshold voltage and having a source terminal connected to the positive electrode of a first corresponding one of the electric cell blocks, a gate terminal and a drain terminal, a drain terminal connected to the negative electrode of the first corresponding electric cell block and a gate terminal, the bias voltage source applying a bias voltage between the gate terminal and the drain terminal.

12. An assembled battery system comprising:

an assembled battery including a plurality of electric cell blocks connected in series, the electric cell blocks each including at least one nonaqueous electrolyte secondary battery;

a voltage measuring unit configured to measure a plurality of voltages of the electric cell blocks;

a controller which controls charge/discharge of the assembled battery in accordance with the measured voltages; and bypass circuits connected in parallel to the electric cell blocks, the bypass circuits each bypassing a current that flows from a negative electrode of one of the electric cell blocks to a positive electrode of the one of electric cell blocks when the measured voltage of the one of electric cell blocks is a negative value not greater than a threshold value, wherein the bypass circuits each include a MOSFET and a bias voltage source, the MOSFET storing a threshold voltage and having a source terminal connected to the positive electrode of a first corresponding one of the electric cell blocks, a gate terminal and a drain terminal, a drain terminal connected to the negative electrode of the first corresponding electric cell block and a gate terminal, the bias voltage source applying a bias voltage between the gate terminal and the drain terminal.

* * * * *